United States Patent
Sakata (10) Patent No.: US 7,571,043 B2
(45) Date of Patent: *Aug. 4, 2009

(54) ROLL-OVER SUPPRESSING CONTROL APPARATUS AND METHOD FOR A VEHICLE

(75) Inventor: Kunio Sakata, Tokyo (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/084,865

(22) Filed: Mar. 21, 2005

(65) Prior Publication Data

US 2005/0222729 A1    Oct. 6, 2005

(30) Foreign Application Priority Data

Mar. 25, 2004   (JP)   .............................. 2004-090283

(51) Int. Cl.
    G06F 19/00 (2006.01)
(52) U.S. Cl. .............................. 701/72; 701/33; 701/36; 280/5.502; 280/5.506; 340/440
(58) Field of Classification Search ................. 280/282, 280/5.502, 5.506, 5.5; 701/38, 45, 70, 124, 701/78, 33, 36, 72; 340/440
    See application file for complete search history.

(56) References Cited

U.S. PATENT DOCUMENTS

| | | | |
|---|---|---|---|
| 6,086,168 A | 7/2000 | Rump | |
| 6,315,373 B1 | 11/2001 | Yamada et al. | |
| 6,554,293 B1* | 4/2003 | Fennel et al. | 280/5.502 |
| 7,302,331 B2* | 11/2007 | Meyers et al. | 701/71 |
| 2002/0095251 A1* | 7/2002 | Oh et al. | 701/70 |
| 2003/0055549 A1* | 3/2003 | Barta et al. | 701/70 |
| 2003/0204293 A1* | 10/2003 | Shiino et al. | 701/37 |
| 2004/0181329 A1* | 9/2004 | Tseng et al. | 701/38 |
| 2005/0049773 A1* | 3/2005 | Kitapini et al. | 701/70 |
| 2005/0251316 A1* | 11/2005 | Kato et al. | 701/70 |

FOREIGN PATENT DOCUMENTS

| | | |
|---|---|---|
| DE | 19632943 | 8/1996 |
| JP | 08217648 A | 8/1996 |
| JP | 10024819 | 1/1998 |

(Continued)

*Primary Examiner*—Khoi H. Tran
*Assistant Examiner*—Ronnie Mancho
(74) *Attorney, Agent, or Firm*—Jacobson Holman PLLC (57) ABSTRACT

A roll-over suppressing control apparatus for a vehicle is disclosed which can carry out roll-over suppressing control appropriately in response to the type of turning. Upon turning of the vehicle, if a parameter corresponding to the rolling behavior of the vehicle becomes higher than a control start criterion value set in advance, then roll-over suppressing control of suppressing rolling of the vehicle is started. Then, if the parameter becomes lower than a control end criterion value set in advance, then the roll-over suppressing control is ended. As the control end criterion value, a steady turning control end criterion value is used when the turning of the vehicle is steady turning, but when the turning of the vehicle is non-steady turning such as lane change turning, a non-steady turning control end criterion value set to a value lower than that of the steady turning control end criterion value is used.

5 Claims, 6 Drawing Sheets

FOREIGN PATENT DOCUMENTS

| | | |
|---|---|---|
| JP | 11011272 | 1/1999 |
| JP | 2000104582 | 4/2000 |
| JP | 2000335388 | 12/2000 |
| JP | 2001-50973 | 2/2001 |
| JP | 2003-223700 | 8/2003 |
| JP | 08301734 A | 11/2006 |
| WO | 03/008242 | 1/2003 |

* cited by examiner

UPON LEFTWARD TURNING

FIG. 3(b)

UPON RIGHTWARD TURNING

ROLL-OVER SUPPRESSING CONTROL APPARATUS AND METHOD FOR A VEHICLE

BACKGROUND OF THE INVENTION

1. Field of the Invention

This invention relates to a roll-over suppressing control apparatus for a vehicle which secures the traveling performance of the vehicle and suppresses overturning of the vehicle.

2. Description of the Related Art

When a vehicle turns, a moment in the rolling direction is generated on the vehicle body depending upon the traveling speed or the steering situation and sometimes deteriorates the stability of the vehicle. In such an instance, if the moment in the rolling direction increases excessively, then there is the possibility that roll-over (overturning) may occur with the vehicle. Therefore, a control apparatus which, when there is the possibility that a vehicle may suffer from roll-over, decreases the vehicle speed to suppress the roll-over has conventionally been proposed.

For example, Japanese Patent Laid-Open No. 2000-104582 (hereinafter referred to as Patent Document 1) discloses a control apparatus which interrupts, if it is determined that the roll-over behavior of a vehicle is unstable, fuel supply to the engine and re-starts, after the rolling behavior of the vehicle is stabilized, the fuel supply to the engine in response to the value of the lateral acceleration (lateral G) of the vehicle. With the control apparatus of the configuration described, when the rolling behavior of the vehicle is in an unstable state, the engine torque is reduced so that the wheels may grip the road surface. Then, after the roll state of the vehicle is placed into a stable state, the control of reducing the engine torque is ended in response to the value of the lateral acceleration of the vehicle so that a stabilized state wherein hunting of control does not occur can be established.

While the control apparatus disclosed in Patent Document 1 reduces the driving force of the vehicle through control of the engine torque to suppress the vehicle speed, also an apparatus which applies braking force to the wheels to suppress the vehicle speed has been proposed.

For example, Japanese Patent Laid-Open No. Hei 10-24819 (hereinafter referred to as Patent Document 2) discloses a control apparatus which has a first control mode for controlling the posture of a vehicle based on a turning characteristic (magnitude of the yaw rate) of the vehicle and a second control mode for controlling the rolling (overturning) of the vehicle based on an excessive roll parameter (lightness of the load to a wheel or deceleration of a wheel) of the vehicle. In the first control mode, a difference in braking force is provided between inner and outer wheels to control the yaw moment in the turning or turning round direction of the vehicle. In the second control mode, braking force is applied to individual wheels and the amount of fuel to be supplied to the engine is reduced to control the vehicle speed. With the control apparatus having the configuration described, when the vehicle is in the first control mode, restoration of an appropriate posture of the vehicle can be achieved, and when the vehicle is in the second control mode, the centrifugal force to act upon the center of gravity of the vehicle is reduced to prevent rolling of the vehicle and the driving stability can be maintained well.

In this manner, in the control apparatus of Patent Document 2, in order to prevent rolling of a vehicle, control of applying braking force to the individual wheels is carried out simultaneously in addition to the control of reducing the engine torque disclosed in Patent Document 1.

As described hereinabove, where control of suppressing the roll-over of a vehicle is performed, a control apparatus therefor is generally configured such that a parameter value relating to the rolling behavior of the vehicle is referred to and, if the parameter value representative of the rolling behavior is displaced to the behavior unstable side with respect to a control start criterion value, then the control is started, whereafter the control is ended when the parameter value representative of the rolling behavior is displaced to the behavior stable side with respect to a control end criterion value.

The parameter value representative of the rolling behavior in this instance may be the roll rate or the lateral accelerate (lateral G) generated on the vehicle, and the start or the end of the roll-over suppressing control can be determined using such parameter values.

Incidentally, in the roll-over suppressing control for a vehicle, the brake or the engine output power of the vehicle is controlled. However, the brake or the engine output power of the vehicle should originally be controlled in accordance with the intention (operation) of the driver. Accordingly, the roll-over suppressing control for a vehicle which is carried out independently of the intention of the driver should naturally be carried out only when it is required. In this regard, it is significant to set a control start condition and a control end condition such as a control start reference value and a control end reference value to appropriate values.

In the case of the control end condition, the end of the control is determined from the state of the vehicle while the control is being carried out. However, even if the rolling behavior of the vehicle is suppressed while the control is being carried out, when the control is ended in this state, the rolling behavior of the vehicle may sometimes increase again. In this instance, not only the possibility of the roll-over of the vehicle cannot be reduced, but also control hunting takes place unfavorably.

Accordingly, the control system is desirably configured such that, if the rolling behavior of the vehicle increases after the roll-over suppressing control of the vehicle is ended, then the control is continued, but if the rolling behavior of the vehicle does not increase even if the roll-over suppressing control of the vehicle is ended, then the control is ended rapidly.

Meanwhile, turning traveling of a vehicle which makes an object of roll-over suppressing control of the vehicle can be classified roughly into unsteady (transient) turning upon lane change or emergency avoiding steering which involves sudden changeover of the turning direction (such turning is hereinafter referred to also as lane change turning) and steady turning (hereinafter referred to also as simple turning) such as turning along a loop bridge or the like along which turning in the same direction continues and turning along a moderate S-shaped curve.

In the simple turning, the rolling behavior does not change suddenly. Therefore, if the rolling behavior of the vehicle is suppressed once by the roll-over suppressing control, then even if the control is ended thereafter, the rolling behavior seldom increases again. Therefore, preferably the control end condition when the roll-over suppressing control is proceeding during simple turning is set to such a low condition that the rolling behavior is improved a little so that the control is ended without waiting that the rolling behavior of the vehicle is suppressed by a great amount, that is, the control is ended at a point of time at which the rolling behavior of the vehicle is suppressed to a certain degree.

In contrast, in the lane change turning, since the steering direction is changed over midway, the rolling behavior of the vehicle changes suddenly due to an aftershock, and particularly while the roll rate decreases, the rolling angle itself increases. From this situation, even if the rolling behavior (for example, the value of the roll rate) of the vehicle suppressed once by the roll-over suppressing control, when the control is ended thereafter, the rolling behavior of the vehicle sometimes increases again. Therefore, preferably the control end condition when the roll-over suppressing control is proceeding during lane change turning of the vehicle is set to such a high condition that the rolling behavior is enhanced sufficiently so that the control is ended after it is waited that the rolling behavior of the vehicle is suppressed by a great amount.

Conventionally, the end condition of the roll-over suppressing control is set to a fixed condition irrespective of such types of turning described above. Therefore, if the control end condition is set to such a low condition that the rolling behavior is improved a little in conformity with the condition for simple turning, then if the control is ended upon lane change turning, then the rolling behavior of the vehicle may possibly increase again. On the contrary, if the control end condition is set to such a high condition that the rolling behavior is improved sufficiently in conformity with the condition for lane change turning, then upon simple turning, the roll-over suppression control continues for more than a necessary period of time, which gives an unfamiliar feeling to the driver.

SUMMARY OF THE INVENTION

It is an object of the present invention to provide a roll-over suppressing control apparatus for a vehicle which can carry out roll-over suppressing control appropriately in response to the type of turning.

In order to attain the object described above, according to an aspect of the present invention, there is provided a roll-over suppressing control apparatus for a vehicle, comprising roll behavior information detection means for detecting roll behavior information of the vehicle, roll suppression means for suppressing rolling of the vehicle, roll-over suppressing control means for rendering the roll suppression means operative to start roll-over suppressing control of suppressing rolling of the vehicle when a parameter corresponding to the rolling behavior of the vehicle based on the roll behavior information detected by the roll behavior information detection means upon turning of the vehicle becomes higher than a control start criterion value set in advance and ending the roll-over suppressing control when the parameter becomes lower than a control end criterion value set in advance, and turning type determination means for determining whether the turning of the vehicle is steady turning or non-steady turning represented by a lane change, a steady turning control end criterion value for being used where it is determined by the turning type determination means that the turning of the vehicle is the steady turning and a non-steady turning control end criterion value for being used where it is determined by the turning type determination means that the turning of the vehicle is the non-steady turning being provided as the control end criterion value, the non-steady turning control end criterion value being set to a value lower than that of the steady turning control end criterion value.

In the roll-over suppressing control apparatus, the roll-over suppressing control means renders the roll suppression means operative to start roll-over suppressing control of suppressing rolling of the vehicle when the parameter corresponding to the rolling behavior of the vehicle based on the roll behavior information detected by the roll behavior information detection means upon turning of the vehicle becomes higher than the control start criterion value set in advance, and ends the roll-over suppressing control when the parameter becomes lower than the control end criterion value set in advance. Consequently, the possibility of the roll-over of the vehicle is suppressed.

When the control end determination is performed, if the turning of the vehicle is steady turning, then the steady turning control end criterion value is used, but if the turning of the vehicle is non-steady turning, the non-steady turning control end criterion value is used. Since the non-steady turning control end criterion value is set to a value lower than that of the steady turning control end criterion value, upon non-steady turning, the roll-over suppressing control is ended using it as a condition that the rolling behavior becomes smaller than that upon steady turning. Accordingly, upon steady turning upon which the rolling behavior of the vehicle is liable to converge, the roll-over suppressing control is ended without waiting that the rolling behavior becomes sufficiently small, and consequently, unnecessary control can be eliminated. On the other hand, upon non-steady turning upon which the rolling behavior of the vehicle is not liable to converge, the roll-over suppressing control is ended after the rolling behavior becomes sufficiently small. Consequently, the roll-over suppressing control can be carried out appropriately in accordance with the type of turning.

Preferably, the roll behavior information detection means is a roll rate sensor for detecting the roll rate of the vehicle and the parameter is the roll rate, and the control end criterion value is set as a roll rate threshold value. With the roll-over suppressing control apparatus, the rolling behavior can be grasped precisely and the roll-over suppressing control can be carried out appropriately.

Preferably, the roll suppression means includes a braking mechanism capable of braking a wheel of the vehicle, and the roll-over suppressing control means applies braking to the wheel through the braking mechanism to slow down the vehicle speed to suppress rolling of the vehicle. With the roll-over suppressing control apparatus, rolling of the vehicle can be suppressed readily and with certainty to suppress the possibility of the roll-over of the vehicle.

Preferably, the roll suppression means includes engine output control means capable of suppressing the output power of an engine of the vehicle, and the roll-over suppressing control means suppresses the output power of the engine through the engine output control means to slow down the vehicle speed to suppress rolling of the vehicle. Also with the roll-over suppressing control apparatus, rolling of the vehicle can be suppressed readily and with certainty to suppress the possibility of the roll-over of the vehicle.

Preferably, the braking mechanism is capable of braking left and right wheels of the vehicle separately from each other, and when the control start condition is satisfied, the roll-over suppressing control means controls the braking mechanism so as to apply the braking force to the turning outer wheel or wheels. With the roll-over suppressing control apparatus, upon turning of the vehicle, braking force is applied to the turning outer wheel, and consequently, the vehicle speed can be reduced effectively. Further, a moment in the turning outer direction can be applied to the vehicle, and consequently, the turning radius can be increased thereby to effectively suppress the possibility of the roll-over of the vehicle.

Preferably, if the vehicle during turning is steered in the opposite direction to the turning direction, then the turning type determination means determines that the turning of the vehicle is the non-steady turning represented by a lane change. With the roll-over suppressing control apparatus, the type of turning can be determined readily and with a high degree of accuracy.

According to another aspect of the present invention, there is provided a roll-over suppressing control method for a vehicle, comprising the steps of detecting roll behavior information of the vehicle when the vehicle travels, determining based on the roll behavior information detected upon turning of the vehicle whether or not a parameter corresponding to the rolling behavior of the vehicle becomes higher than a control start criterion value set in advance, rendering, when the parameter corresponding to the rolling behavior of the vehicle becomes higher than the control start criterion value set in advance, roll suppression means operative to start roll-over suppressing control of suppressing rolling of the vehicle, determining, during the roll-over suppressing control, whether the turning of the vehicle is steady turning or non-steady turning represented by a lane change, and ending the roll-over suppressing control when the parameter corresponding to the rolling behavior of the vehicle becomes lower than a control end criterion value set in advance, a steady turning control end criterion value ($R_{rs2}$) being used as the control end criterion value where it is determined that the turning of the vehicle is the steady turning whereas a non-steady turning control end criterion value set ($R_{rs3}$) to a value lower than that of the steady turning control end criterion value is ($R_{rs2}$) used as the control end criterion value where it is determined that the turning of the vehicle is the non-steady turning.

Preferably, the roll behavior information and the parameter are a roll rate, and the control end criterion value is set as a roll rate threshold value.

Preferably, the roll-over suppressing control is performed by applying braking to a wheel of the vehicle through a braking mechanism, which is capable of braking the wheel, to slow down the vehicle speed to suppress rolling of the vehicle.

Further preferably, the braking mechanism is capable of braking left and right wheels of the vehicle separately from each other, and in the roll-over suppressing control, when the control start condition is satisfied, the braking mechanism is controlled so as to apply the braking force to the turning outer wheel or wheels.

Preferably, the roll-over suppressing control is performed by suppressing the output power of an engine of the vehicle to slow down the vehicle speed to suppress rolling of the vehicle.

Preferably, in the determination of the type of turning of the vehicle, if the vehicle during turning is steered in the opposite direction to the turning direction, then it is determined that the turning of the vehicle is the non-steady turning represented by a lane change.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3(*a*) is a schematic view illustrating control by the roll-over suppressing control apparatus for a vehicle when the vehicle is turning in a leftward direction;

FIG. 3(*b*) is a schematic view illustrating control by the roll-over suppressing control apparatus for a vehicle when the vehicle is turning in a rightward direction;

FIG. 4(*a*) is a diagram illustrating a control end condition by the roll-over suppressing control apparatus for a vehicle when turning of the vehicle is steady turning;

FIG. 4(*b*) is a diagram illustrating a control end condition by the roll-over suppressing control apparatus for a vehicle when turning of the vehicle is non-steady turning;

DESCRIPTION OF THE PREFERRED EMBODIMENT

Referring to FIGS. 1 to 6, there is shown a roll-over suppressing control apparatus for a vehicle according to an embodiment of the present invention.

Figure 2:
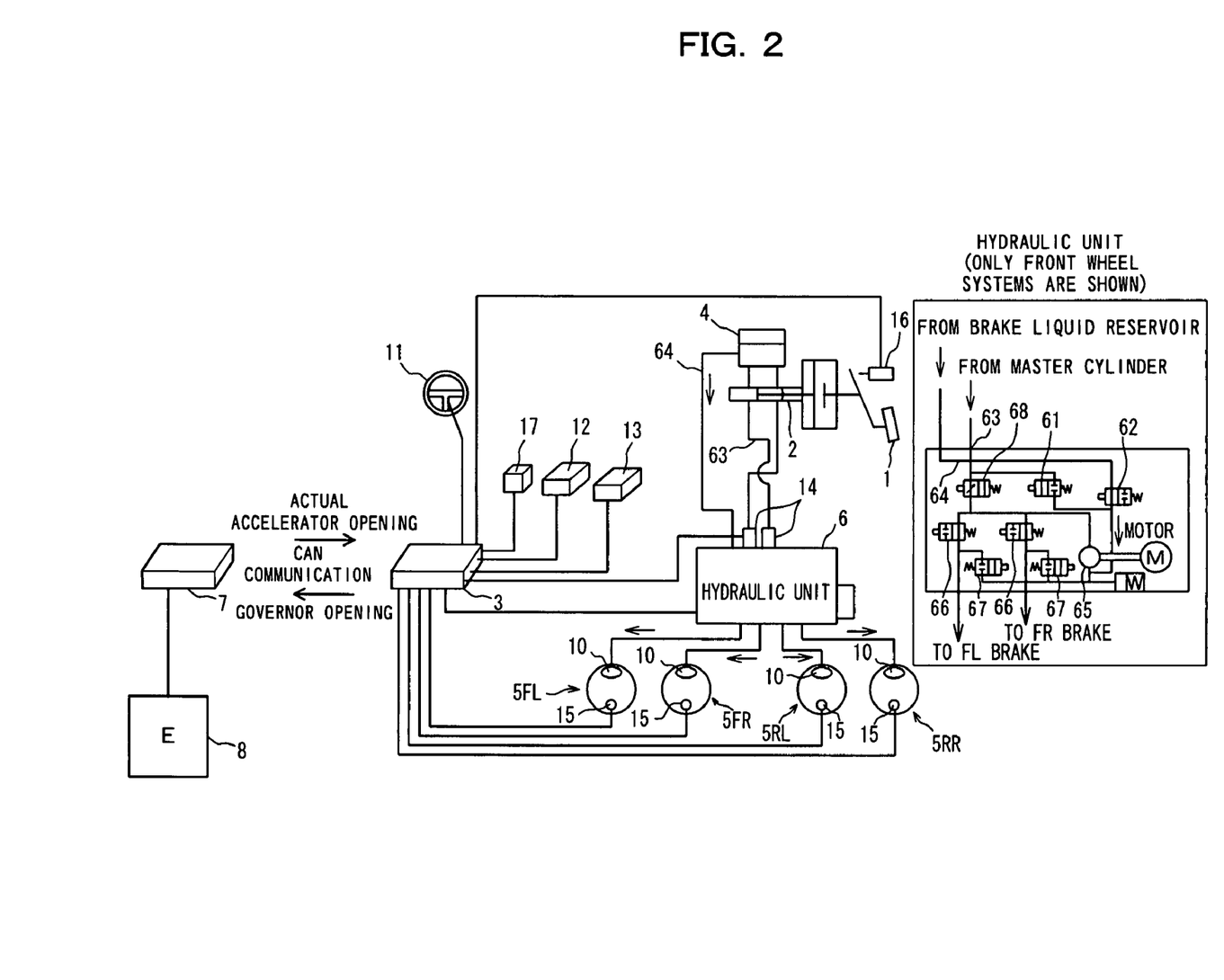
FIG. 2 is a system block diagram showing a general configuration of a braking system for a vehicle which includes the roll-over suppressing control apparatus for a vehicle.

The roll-over suppressing control apparatus for a vehicle according to the embodiment of the present invention is used with such a braking system for a vehicle as shown in FIG. 2. Referring to FIG. 2, the braking system for a vehicle includes a brake pedal 1, a master cylinder 2 which operates in an interlocking relationship with an operation of the brake pedal 1, and a hydraulic unit 6 for controlling the brake fluid pressure to be supplied from the master cylinder 2 or a brake fluid reservoir 4 to wheel cylinders of wheel brakes (hereinafter referred to as brakes) 10 for braking wheels (front left and right wheels and rear left and right wheels) 5FL, 5FR, 5RL, 5RR in response to the state of the master cylinder 2 or in accordance with an instruction from a braking controller (brake ECU) 3. Further, the braking system for a vehicle further includes an engine ECU 7 as engine output adjustment means for adjusting the output power of an engine 8 such that adjustment of the engine output power suitable for a state of the vehicle can be carried out through CAN communication of the engine ECU 7 with the brake ECU 3.

It is to be noted here that a braking system is formed from a hydraulic pressure adjusting system including the master cylinder 2, hydraulic unit 6 and so forth and the wheel brakes 10 for the braking wheels and so forth.

The roll-over suppressing control according to the present embodiment is control for preventing the roll rate to act upon the vehicle from becoming excessively high thereby to suppress the possibility of the roll-over (overturning) of the vehicle. The roll-over suppressing control has two control modes of roll-over suppressing braking control which applies braking to the wheels and engine output suppressing control which suppresses the engine output power.

The roll-over suppressing braking control and the engine output suppressing control are carried out when the roll-over behavior of the vehicle increases to such a degree that the possibility that it may cause roll-over of the vehicle may occur. It is to be noted that the roll rate of the vehicle is used as a parameter for determination of the degree of the rolling behavior of the vehicle.

In the roll-over suppressing braking control, braking force is applied to a turning outer wheel through a braking mechanism to provide a moment in a direction to suppress the turning to the vehicle and reduce the lateral force of the wheels to suppress the turning of the vehicle (to increase the turning radius) and simultaneously slow down the vehicle speed to suppress the rolling of the vehicle to suppress the roll-over. On the other hand, in the engine output suppressing control, if the rolling behavior of the vehicle increases to such a degree that the possibility that it may cause roll-over of the vehicle occurs, then the output power of the engine is reduced to slow down the vehicle speed thereby to suppress the rolling of the vehicle to suppress the roll-over. The function of suppressing the rolling of the vehicle by such braking or reduction of the engine output power as just described is hereinafter referred to as rolling suppression means, and the function of suppressing the roll-over through such roll-over suppression means is hereinafter referred to as roll-over suppressing control means.

It is to be noted that, in the present embodiment, when the brake pedal 1 is operated, both of the roll-over suppressing braking control and braking control (driver control) which is performed in accordance with the operation amount of the brake pedal 1 are integrated to perform such integrated braking control.

As seen in FIG. 2 (in FIG. 2, only the left and right wheel brakes for the front wheels are shown), a differential pressure valve 68 in the hydraulic unit 6 operates in the roll-over suppressing braking control so that a predetermined pressure difference may appear between the upstream and the downstream of the differential pressure valve 68.

When the vehicle is in the roll-over suppressing control mode in which the roll-over of the vehicle is suppressed and the brake pedal 1 is not operated, an in-line intake valve 61 is closed while an out-line intake valve 62 is opened. Consequently, the brake fluid in the brake fluid reservoir 4 is introduced through an out-line 64 and the out-line intake valve 62 into a pump 65 and is pressurized by the pump 65, and the pressure of the brake liquid is adjusted by a fluid pressure holding valve 66 and a pressure reducing valve 67 and the brake fluid of the adjusted pressure is supplied to the brakes 10 for the wheels.

On the other hand, when the vehicle is in the roll-over suppressing control mode and the brake pedal 1 is operated, the in-line intake valve 61 is opened and the out-line intake valve 62 is closed. Consequently, the brake fluid in the master cylinder 2 is introduced through an in-line 63 and the in-line intake valve 61 into the pump 65 and is pressurized by the pump 65. Then, the pressure of the brake fluid is adjusted by the liquid pressure holding valve 66 and the pressure reducing valve 67, and the brake fluid of the adjusted pressure is supplied to the brakes 10 for the wheels.

It is to be noted that, if the braking control (driver control) by the driver is performed upon the behavior control of the vehicle, then the pressure adjustment by the fluid pressure holding valve 66 and the pressure reducing valve 67 is performed based on pressure information of the brake fluid in the master cylinder 2 detected by a fluid pressure sensor 14. Further, the in-line 63 and the out-line 64 join together on the downstream of the in-line intake valve 61 and the out-line intake valve 62, and the pump 65 is disposed on the downstream of the joining location. The liquid pressure holding valve 66 and the pressure reducing valve 67 are provided for each of the braking wheels 5FL, 5FR, 5RL, 5RR on the downstream of the pump 65.

Upon normal braking (driver braking) when the vehicle is not in the roll-over suppressing control mode, the in-line intake valve 61 and the out-line intake valve 62 are closed, and the differential pressure valve 68 and the liquid pressure holding valve 66 are opened while the pressure reducing valve 67 is closed. Consequently, a brake fluid pressure corresponding to the pressure (that is, braking operation force) in the master cylinder 2 is supplied to the brake 10 for each of the wheels through the in-line 63, differential pressure valve 68 and liquid pressure holding valve 66. On the other hand, when an ABS (antilock brake system or antiskid brake system) operates, the brake fluid pressure corresponding to the braking operation force is suitably adjusted through the liquid pressure holding valve 66 and the pressure reducing valve 67 so that each wheel may not be locked.

The in-line intake valve 61, out-line intake valve 62, pump 65, and liquid pressure holding valves 66, pressure reducing valves 67 and differential pressure valve 68 for the braking wheels of the hydraulic unit 6 having such a configuration as described above are controlled by the brake ECU 3.

Various signals are inputted to the brake ECU 3. In particular, a steering wheel angle signal is inputted from a steering wheel angle sensor 11 provided for a steering wheel, and a roll rate signal of the vehicle body is inputted from a roll rate sensor (roll behavior information detection means) 13 provided on the vehicle body. Further, a wheel speed signal is inputted from a wheel speed sensor 15 for each wheel, and a brake pedal operation signal is inputted from a brake switch 16. Furthermore, a forward-backward acceleration signal and a lateral acceleration signal are inputted from a forward-backward and lateral acceleration sensor 17 provided on the vehicle body.

Figure 1:
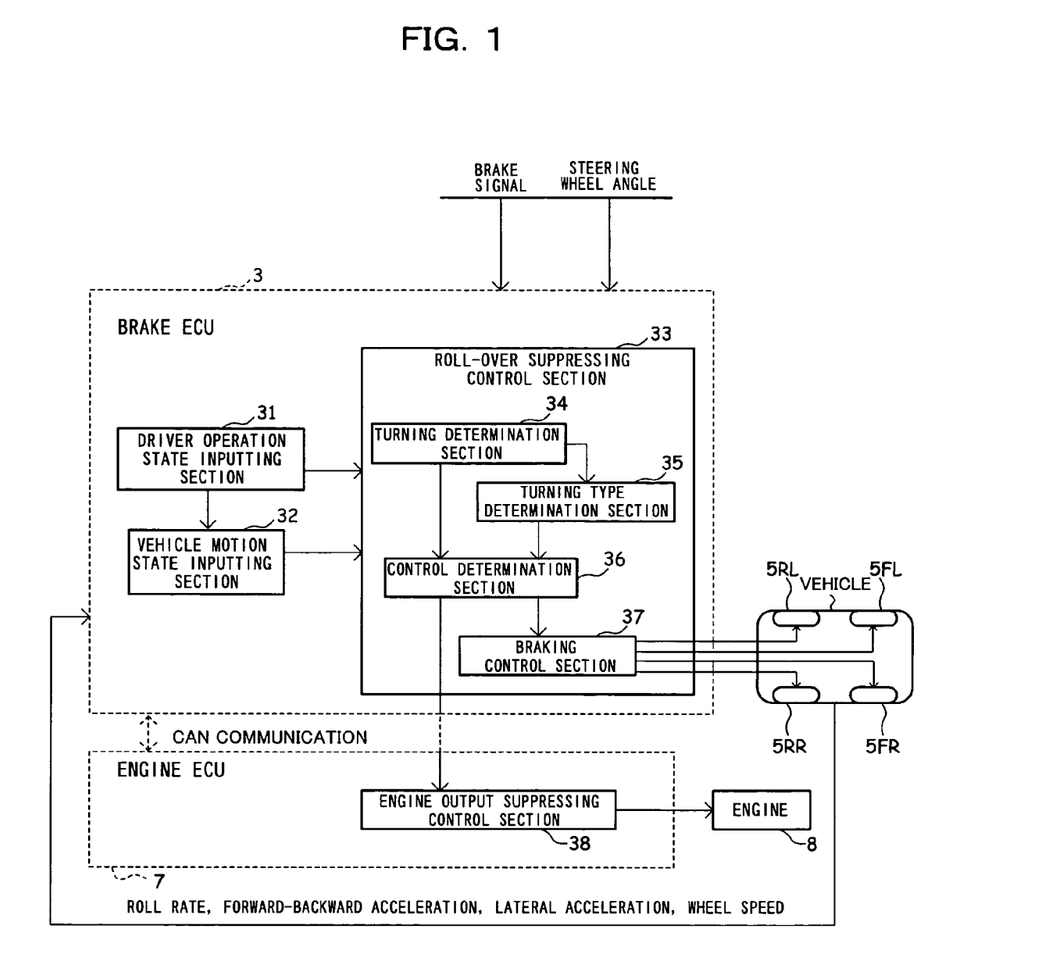
FIG. 1 is a control block diagram of a roll-over suppressing control apparatus for a vehicle according to an embodiment of the present invention.

The brake ECU 3 includes such various functional elements as seen in FIG. 1. Referring to FIG. 1, the brake ECU 3 includes a driver operation state inputting section 31 for receiving various kinds of information relating to an operation state of the driver as inputs thereto and suitably processing and outputting the input information. The brake ECU 3 further includes a vehicle motion state inputting section 32 for receiving various kinds of information relating to a motion condition (behavior) of the vehicle as inputs thereto and suitably processing and outputting the input information, and a roll-over suppressing control section 33.

The driver operation state inputting section 31 determines from the brake pedal operation signal from the brake switch 16 whether or not the brake pedal 1 is operated. Further, the driver operation state inputting section 31 differentiates the steering wheel angle with respect to time based on the steering wheel angle signal from the steering wheel angle sensor 11 to calculate the steering wheel angular velocity (steering angular velocity).

The vehicle motion state inputting section 32 calculates a vehicle body speed, a roll rate and a lateral acceleration. Although the vehicle body speed is normally calculated based on wheel speed signals from the wheel speed sensors 15, if a slip occurs with a wheel, then the vehicle motion state inputting section 32 adds a time integrated value of the forward-backward acceleration obtained from the forward-backward and lateral acceleration sensor 17 to the vehicle body speed based on the wheel speed signal obtained till then to calculate the vehicle body speed (in this instance, the calculated vehicle body speed is an estimated vehicle body speed).

The roll-over suppressing control section 33 includes a turning determination section 34 for determining a start and an end of turning of the vehicle, a turning type determination section 35 for determining whether turning of the vehicle is steady turning or non-steady turning represented by lane change turning, a control determination section 36 for determining a start and an end of roll-over suppressing control, a roll-over suppressing braking control section 37 for setting a control amount (roll-over suppressing control braking force) to each braking wheel upon roll-over suppressing control and carrying out braking based on the set control amounts, and a roll-over suppressing engine output suppressing control section 38 for causing the engine ECU 7 to reduce the fuel supply amount to the engine 8 to reduce the engine output power.

It is to be noted that the engine output suppressing control section 38 is provided as one of functional elements in the engine ECU 7, and a control signal is sent from the control determination section 36 of the brake ECU 3 to the engine output suppressing control section 38 of the engine ECU 7 by CAN communication between the brake ECU 3 and the engine ECU 7.

Further, the roll-over suppressing control section 33 starts the roll-over suppressing control if it is determined by the control determination section 36 that the roll-over suppressing control should be started, and ends the roll-over suppressing control if it is determined by the control determination section 36 that the roll-over suppressing control should be ended. Upon the end determination of the roll-over suppressing control, if all of the four wheels remain in contact with the road surface upon the roll-over suppressing control, then control of applying braking force to all of the four wheels (all-wheel braking control) is performed, but if all of the four wheels do not remain in contact with the road surface, then control of applying driving force to a turning outer wheel or wheels which remain in contact with the road surface is performed. Such braking control is performed while a control amount (braking force) is set by the braking control section 37.

Figure 3A:
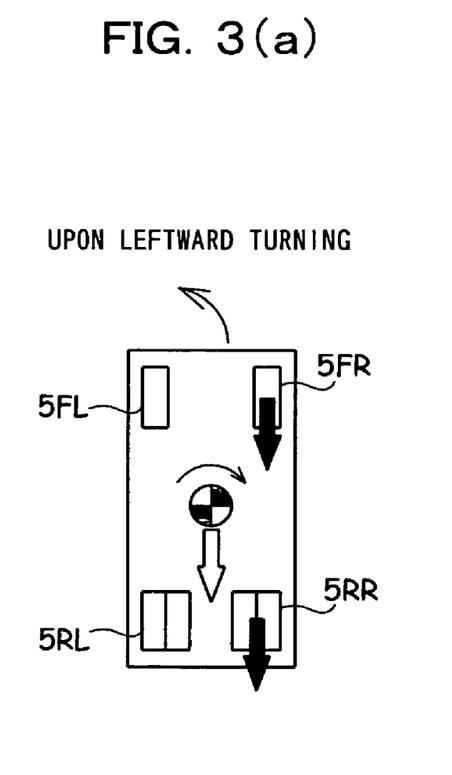
Figure 3B:
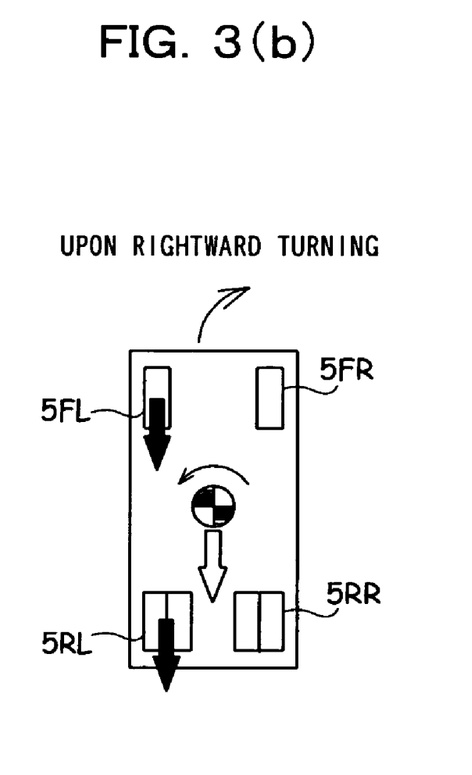

It is to be noted that, in ordinary roll-over suppressing control, braking force is applied to the front and rear wheels of the turning outer wheels as seen in FIGS. 3(*a*) and 3(*b*). The magnitude of the braking force to be applied at this time is set to a value corresponding to the magnitude of the roll rate $R_r$ by the braking control section 37.

It is to be noted that, while it is effective to suppress the lateral acceleration of the vehicle and to suppress the vehicle speed in order to suppress the rolling, the braking force to the front wheel as a turning outer wheel contributes much to suppression of the lateral acceleration of the vehicle, and the braking force to the rear wheel as a turning outer wheel contributes much to suppression of the vehicle speed.

The turning determination section 34 determines that turning of the vehicle has been started if both of conditions (i) that the vehicle body speed $V_b$ is equal to or higher than a reference value (low speed value set in advance) $V_1$ and (ii) that the magnitude of the lateral acceleration $G_y$ of the vehicle body is equal to or higher than a reference value (value set in advance) $G_{y1}$ are satisfied. Further, the turning determination section 34 determines that the turning of the vehicle has ended if any one of a condition (iii) that the vehicle body speed $V_b$ is lower than a reference value (low speed value set in advance) $V_2$ (where $V_2<V_1$) and another condition (iv) that the magnitude of the lateral acceleration $G_y$ of the vehicle body is lower than a reference value (predetermined acceleration set in advance) $G_{y2}$ (where $G_{y2}<G_{y1}$) is satisfied.

The turning type determination section 35 determines whether or not the vehicle is turning. Further, if the vehicle is turning, then the turning type determination section 35 determines whether the turning is steady turning (hereinafter referred to also as simple turning) such as turning along a moderate S-shaped curve beginning with turning along a loop bridge or the like along which turning in the same direction continues or non-steady (transient) turning (non-steady turning represented by lane change turning) such as turning upon a lane change or turning upon emergency avoiding steering upon which the turning direction is changed over suddenly.

The turning type determination section 35 in the present embodiment determines that the vehicle is turning when all of a condition that the magnitude $|\omega_h|$ of the steering wheel angular speed (steering angular speed) $\omega_h$ of the vehicle is equal to or higher than a reference value $\omega_{h0}$ ($|\omega_h|\geq\omega_{h0}$), another condition that the magnitude $|G_y|$ of the lateral acceleration $G_y$ generated on the vehicle is equal to or higher than a reference value $G_{y0}$ and a further condition that the vehicle body speed $V_b$ of the vehicle is equal to or higher than a predetermined speed $V_{b0}$ are satisfied. If it is determined that the vehicle is turning, then the turning type determination section 35 sets a turning determination flag $F_{senkai}$ to 1. If, while it remains determined that the vehicle is turning ($F_{senkai}=1$) in this manner, the steering wheel angular speed (steering angular speed) $\omega_h$ of the vehicle changes to the opposite direction to the turning direction and the magnitude $|\omega_h|$ of the steering wheel angular speed (steering angular speed) $\omega_h$ becomes equal to or higher than a turning state determination reference value $\omega_{h1}$ ($|\omega_h|\geq\omega_{h1}$), then the turning type determination section 35 determines that the turning of the vehicle is non-steady turning represented by lane change turning. If it is determined that the vehicle is in non-steady turning, the turning type determination section 35 sets a turning determination flag $F_{1c}$ to 1. On the other hand, even if the vehicle is turning ($F_{senkai}=1$), when the steering wheel angular speed (steering angular speed) $\omega_h$ does not change to the opposite direction to the turning direction or when, even if the steering wheel angular speed changes to the opposite direction, the magnitude $|\omega_h|$ of the steering wheel angular speed (steering angular speed) $\omega_h$ does not become equal to or higher than the turning state reference value $\omega_{h1}$ ($|\omega_h|\geq\omega_{h1}$), the turning type determination section 35 determines that the turning of the vehicle is steady turning (not non-steady turning). If it is determined that the vehicle is in steady turning, then the turning type determination section 35 sets the turning determination flag $F_{1c}$ to 0.

The control determination section 36 determines a start of the roll-over suppressing control based on a predetermined control start condition from a result of the detection of the turning determination section 34 and the detected roll rate $R_r$. Here, the control start condition is that both of a condition that it is determined by the turning determination section 34 that the vehicle is turning and another condition that the magnitude of the roll rate $R_r$ which is the value of a parameter corresponding to the rolling behavior of the vehicle is equal to or higher than a control start threshold value $R_{rs1}$ set in advance are satisfied.

In the roll rate control, braking force is applied to a turning outer wheel. The magnitude of the braking force to be applied at this time is set as a value corresponding to the magnitude of the roll rate $R_r$ based on a coordination map set in advance. It is to be noted that an increasing/decreasing pressure gradient $PR_{RR}$ of the brake liquid pressure controlled by the hydraulic unit 6 is set as a braking control amount (first control amount) of the value corresponding to the magnitude of the roll rate $R_r$.

Further, the control determination section 36 determines, during the roll-over suppressing control, an end of the roll-over suppressing control based on a predetermined control end condition from a result of the detection of the turning determination section 34 and the detected roll rate $R_r$. Here, the control end condition is that any of a condition that it is determined by the turning determination section 34 that the vehicle is not turning and another condition that the magnitude of the roll rate $R_r$ is lower than a control end threshold value $R_{rs2}$ set in advance ($R_{rs2}<R_{rs1}$) is satisfied.

However, if the turning of the vehicle is non-steady turning represented by lane change turning, then the control end threshold value $R_{rs2}$ is changed to another control end threshold value $R_{rs3}$. In other words, the steady turning control end determination threshold value (steady turning control end determination reference value) $R_{rs2}$ and the non-steady turning control end determination threshold value (non-steady turning control end determination reference value) $R_{rs3}$ are set separately from each other as the control end threshold value (control end determination reference value) relating to the roll rate $R_r$. The non-steady turning control end determination threshold value $R_{rs3}$ is set to a roll rate value lower than the steady turning control end determination threshold value $R_{rs2}$, that is, to a roll rate value for a state wherein the rolling behavior of the vehicle is comparatively stabilized. Here, the steady turning control end determination threshold value $R_{rs2}$ is set as a roll rate value in the same direction as the rolling direction, and the non-steady turning control end determination threshold value $R_{rs3}$ is set as a roll rate value in the opposite direction to the rolling direction.

Figure 4A:
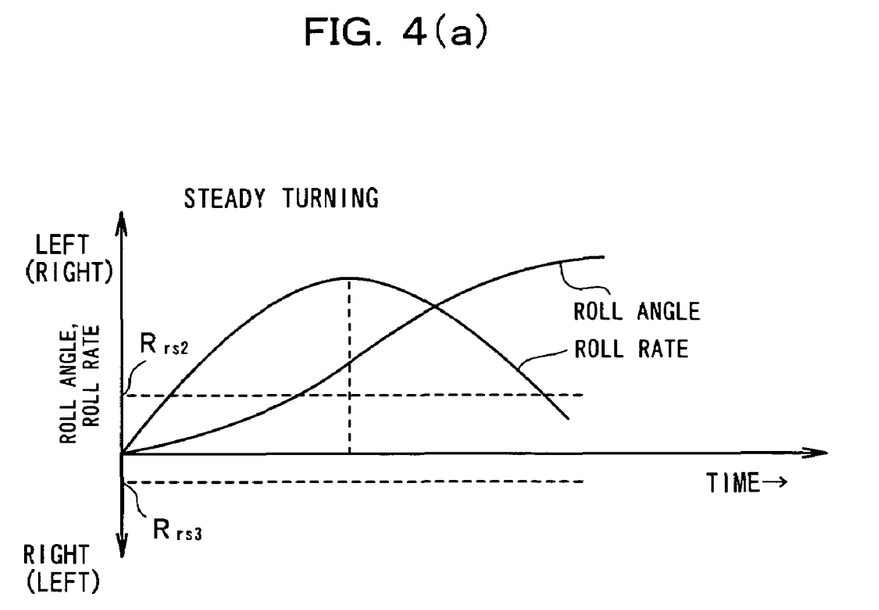
Figure 4B:
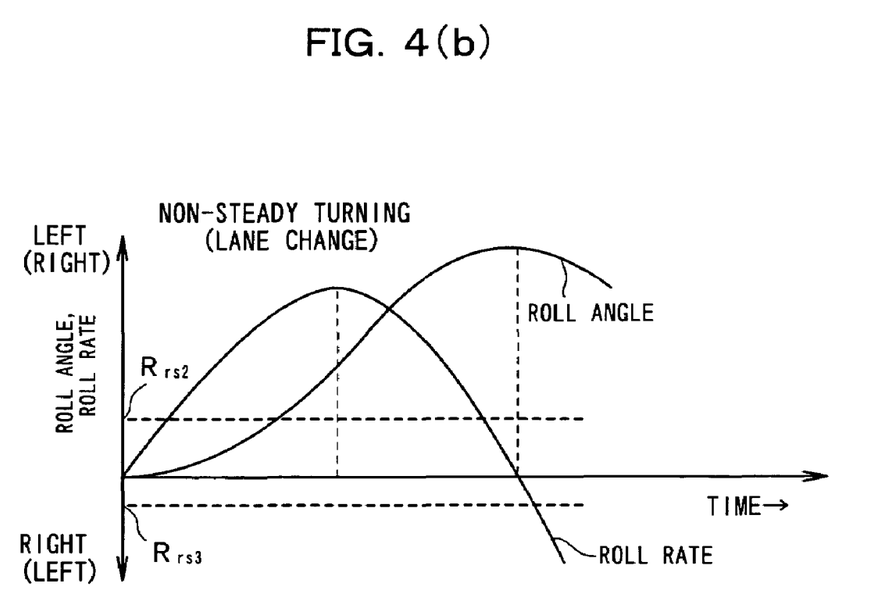

In particular, upon steady turning, the rolling angle varies comparatively moderately as seen in FIG. 4(a), and if the roll rate decreases to some degree, then even if the control is ended at this stage, there is little possibility of the roll-over. Therefore, the steady turning control end determination threshold value $R_{rs2}$ is set to a comparatively high value as a roll rate value in a direction same as the rolling direction. On the other hand, upon non-steady turning such as lane change turning, the rolling angle varies comparatively suddenly as seen in FIG. 4(b), and great rolling called aftershock occurs particularly after the steering direction changes over from the left to the right or from the right to the left. Therefore, if the control is set so as to end at a stage when the roll rate becomes sufficiently low, then the possibility of the roll-over is suppressed significantly. Consequently, the non-steady turning control end determination threshold value $R_{rs3}$ is set to a comparatively low value as a roll rate value (negative value) in the opposite direction to the rolling direction. In other words, the control is set so as to end after the rolling angle decreases.

The roll-over suppressing braking control section 37 sets the control amount upon roll-over suppressing control in response to the roll rate and so forth. In particular, in order that braking force may be applied basically to a turning outer wheel in the braking control, the roll-over suppressing braking control section 37 sets a control amount (roll-over suppressing control driving force) to the pertaining turning outer wheel in response to the roll rate and so forth. Then, the roll-over suppressing braking control section 37 carries out braking based on the setting. Naturally, the control amount at this time may not be a value based on the roll rate but be a predetermined value set in advance.

The roll-over suppressing engine output suppressing control section 38 sets, upon roll-over suppressing control, the output control amount (engine output suppression amount) of the engine in response to the roll rate and so forth, and carries out engine output control in accordance with the setting. Naturally, also the control amount at this time need not correspond to the roll rate but may be a predetermined value set in advance. It is to be noted that such output control of the engine can be performed, in the case of a diesel engine, by control of a governor or the like, but in the case of a gasoline engine, by control of a throttle valve or the like.

Figure 5:
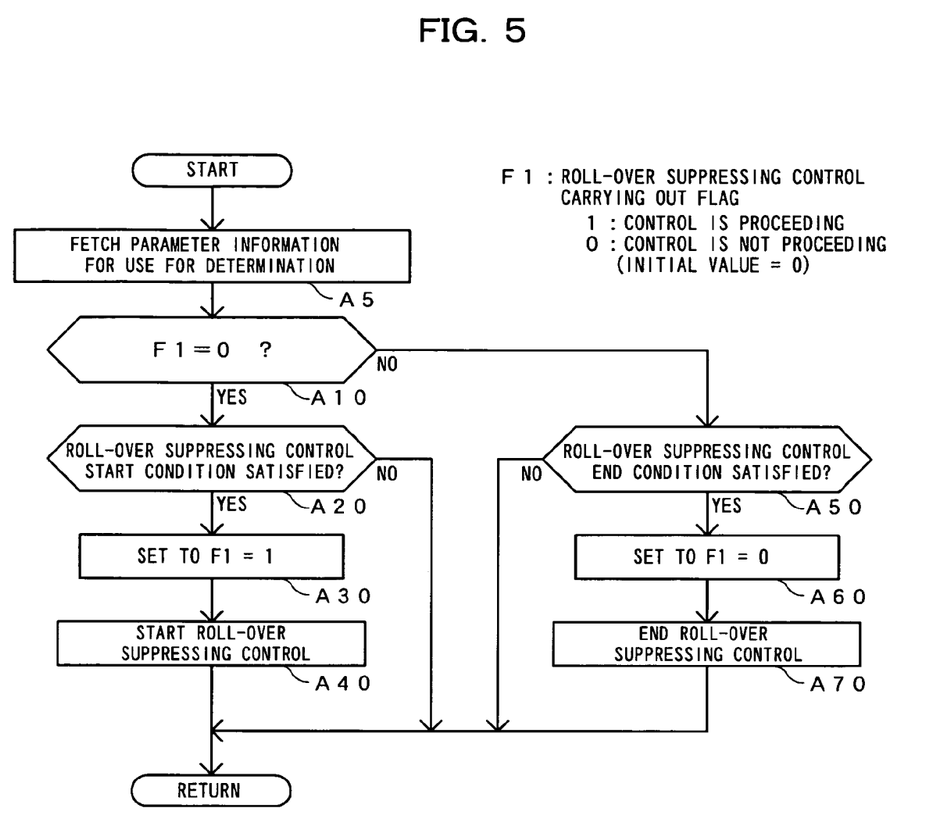
FIG. 5 is a flow chart illustrating control by the roll-over suppressing control apparatus for a vehicle.

Since the roll-over suppressing control apparatus for a vehicle according to the embodiment of the present invention is configured in such a manner as described above, control is carried out, for example, in such a manner as illustrated in FIG. 5.

Referring to FIG. 5, parameters necessary to determine a start or an end of the roll-over suppressing control are inputted first at step A5. Then at step A10, it is determined based on a flag F1 whether or not the roll-over suppressing control is proceeding. The flag F1 for this determination is a flag (roll-over suppressing control carrying out flag) representing whether or not the roll-over suppressing control is proceeding with the vehicle and has an initial value set to 0. Thus, if F1=0 at step A10, then since the roll-over suppressing control is not proceeding, the processing advances to step A20, at which a start condition of the roll-over suppressing control is determined. On the other hand, if F1=1 at step A10, then since the roll-over suppressing control is proceeding, the processing advances to step A50, at which an end condition of the roll-over suppressing control is determined.

At step A20, it is determined from the determination condition described hereinabove based on the parameters inputted at step A5 whether or not the start condition of the roll-over suppressing control is satisfied. If the condition is satisfied, then the processing advances to step A30, at which the flag F1 is set to 1 (on), and further to step A40, at which the roll-over suppressing control is started, whereafter the flow is ended. On the other hand, if the condition is not satisfied at step A20, then the flow is ended immediately without changing the flag and the control.

On the other hand, if the determination at step A10 is F1=1, then it is determined at step A50 from the determination condition described hereinabove based on the parameters inputted at step A5 whether or not the end condition of the roll-over suppressing control in accordance with the type of turning is satisfied. If this condition is satisfied, then the processing advances to step A60, at which the flag F1 is set to 0, and further to step A70, at which the roll-over suppressing control is ended, whereafter this flow is ended. On the other hand, if the condition is not satisfied at step A50, then the flow is ended immediately without changing the flag and the control.

Figure 6:
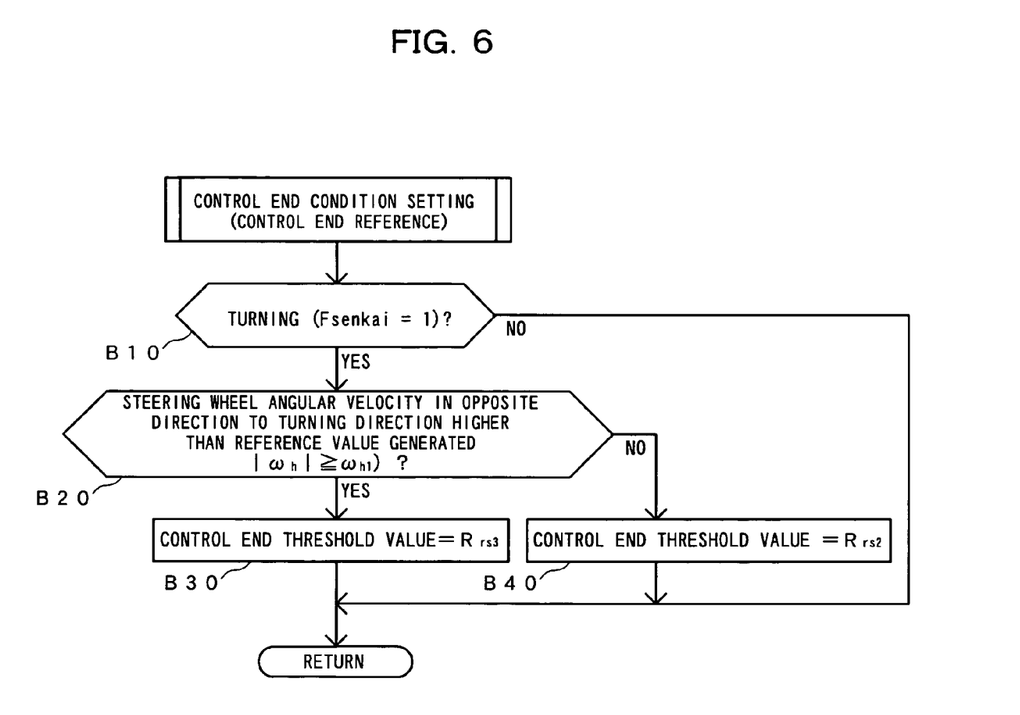
FIG. 6 is a flow chart illustrating setting of a control end condition by the roll-over suppressing control apparatus for a vehicle.

Incidentally, the end condition of the roll-over suppressing control in accordance with the type of turning used at step A50 is set in such a manner as seen in FIG. 6. Referring to FIG. 6, it is first determined whether or not the vehicle is turning during the roll-over suppressing control (step B10). If the vehicle is turning, then it is determined whether or not a steering wheel angular velocity in the opposite direction to the turning direction is generated and the magnitude $|\omega_h|$ of the steering wheel angular speed $\omega_h$ becomes equal to or higher than the turning state determination reference value $\omega_{h1}$ ($|\omega_h| \geq \omega_{h1}$) (step B20). If the magnitude $|\omega_h|$ of the steering wheel angular speed $\omega_h$ in the opposite direction to the turning direction becomes equal to or higher than the turning state determination reference value $\omega_{h1}$ during the turning, then it is determined that the turning of the vehicle is non-steady turning represented by lane change turning and the control end threshold value is set to the non-steady turning control end determination threshold value $R_{rs3}$ (step B30). On the other hand, if the magnitude $|\omega_h|$ of the steering wheel angular speed $\omega_h$ in the opposite direction to the turning direction is lower than the turning state determination reference value $\omega_{h1}$ then it is determined that the turning of the vehicle is steady turning and the control end threshold value is set to the steady turning control end determination threshold value $R_{rs2}$ (step B40).

Accordingly, upon steady turning upon which the rolling behavior of the vehicle is liable to converge, the roll-over suppressing control is ended without waiting that the rolling behavior becomes sufficiently small, and consequently, unnecessary control can be eliminated. On the other hand, upon non-steady turning upon which the rolling behavior of the vehicle is not liable to converge, the roll-over suppressing control is ended after the rolling behavior becomes sufficiently small. Consequently, the roll-over suppressing control can be carried out appropriately in accordance with the type of turning.

While a preferred embodiment of the present invention has been described, the present invention is not limited to the embodiment but can be carried out in various modified forms without departing from the scope of the present invention.

For example, while, in the embodiment described above, various determinations (start determination and end determination of control) of the rolling behavior are performed based on the roll rate upon steering back turning, the determinations are not limited to them but may be carried out otherwise based on, for example, the lateral acceleration, rolling angle or the like of the vehicle.

Further, while, in the embodiment described above, both of the braking control and the engine output suppressing control are used as the roll-over suppressing control, only one of them may be used or any other control may be used in any mode only if it can suppress the roll-over by control of suppressing the turning of a vehicle or of decreasing the speed of a vehicle.

What is claimed is:

1. A roll-over suppressing control apparatus for a vehicle, comprising:
    means for detecting information about rolling behavior of the vehicle;
    means for suppressing rolling of the vehicle;
    means for determining when the vehicle starts turning;
    means for carrying out roll-over suppressing control by activating the roll suppressing means to suppress rolling of the vehicle when the turning determination means has determined that the vehicle has started turning, based on the roll behavior information detected by the roll behavior detection means;
    means for determining whether the turning of the vehicle is a lane change turning or a simple turning, the simple turning being a turning mode that includes continued turning in a same direction;
    means for determining whether a parameter corresponding to the rolling behavior of the vehicle exceeds a control start criterion value set in advance, and for determining whether the parameter falls below a control end criterion value set in advance;
    the roll over suppressing control means:
        (1) beginning the roll-over suppressing control when the control determination means has determined that the parameter exceeds the control start criterion value, which is a value common to the lane change turning and the simple turning, and
        (2) ending the roll-over suppressing control when the control determining means has determined that the parameter falls below the control end criterion value, and
    the control determining means:
        (1) using a simple turning control end criterion value as the control end criterion value when the turning mode determining means determines that the vehicle is simple turning during the roll-over suppressing control; and
        (2) using a lane change turning control end criterion value, which is lower than the simple turning control end criterion value, as the control end criterion when the turning mode determining means determines that the vehicle is lane change turning during the roll-over suppressing control.

2. The roll-over suppressing control apparatus for a vehicle as claimed in claim 1, wherein the roll behavior information detection means is a roll rate sensor that detects the roll rate of the vehicle and the parameter is the roll rate, and the control end criterion value is set as a roll rate threshold value.

3. The roll-over suppressing control apparatus for a vehicle as claimed in claim 1, wherein the roll-over suppression means includes a braking mechanism configured to brake a wheel of the vehicle and means for controlling the output power of an engine of the vehicle, and the roll-over suppressing control means applies braking to the wheel through the braking mechanism and the engine output control means to slow down the vehicle speed to suppress rolling of the vehicle.

4. The roll-over suppressing control apparatus for a vehicle as claimed in claim 3, wherein the braking mechanism is configured to brake left and right wheels of the vehicle separately from each other, and when the control start condition is satisfied, the roll-over suppressing control means controls the braking mechanism so as to apply the braking force to the turning outer wheel or wheels.

5. The roll-over suppressing control apparatus for a vehicle as claimed in claim 1, wherein, if the vehicle during turning is steered in the opposite direction to the turning direction, then the turning mode determining means determines that the turning of the vehicle is lane change turning.

* * * * *